United States Patent [19]

Hegg et al.

[11] Patent Number: 5,028,119
[45] Date of Patent: Jul. 2, 1991

[54] AIRCRAFT HEAD-UP DISPLAY

[75] Inventors: Ronald G. Hegg, Los Angeles; Mao-Jin Chern, Rancho Palos Verdes; Paul C. Norton; John J. Ferrer, both of Los Angeles; Steven A. Stringfellow, Hermosa Beach, all of Calif.

[73] Assignee: Hughes Aircraft Company, Los Angeles, Calif.

[21] Appl. No.: 334,847

[22] Filed: Apr. 7, 1989

[51] Int. Cl.$^5$ .................. G02B 27/14; G09G 3/02; G03B 21/00
[52] U.S. Cl. .................. 350/174; 340/705; 340/980; 434/44; 353/12
[58] Field of Search .......... 340/705, 980; 350/174; 434/44; 353/12

[56] References Cited

U.S. PATENT DOCUMENTS 3,697,154 10/1972 Johnson .......................... 350/174
3,723,805 3/1973 Scarpino et al. ............. 315/27 GD
4,652,870 3/1987 Steward ........................ 434/44
4,799,765 1/1989 Ferrer ........................... 350/174

FOREIGN PATENT DOCUMENTS 2154020 8/1985 United Kingdom .............. 340/705
88/05553 7/1988 World Int. Prop. O. ......... 340/705

Primary Examiner—Stephen C. Buczinski
Attorney, Agent, or Firm—Leonard A. Alkov; Wanda K. Denson-Low

[57] ABSTRACT

A head-up instrument display for a vehicle including a light emitting image source for producing imaging illumination and a combiner including a spherical beamsplitter coating for partially reflecting the imaging illumination to produce a virtual image viewable by the vehicle operator without diverting attention from the outside scene. In one embodiment, the head-up instrument display is self-contained with the combiner being rotatable into a stowed position when not in use.

14 Claims, 5 Drawing Sheets

AIRCRAFT HEAD-UP DISPLAY

BACKGROUND OF THE INVENTION

The disclosed invention is generally directed to a head-up virtual image display for aircraft avionic instrumentation, and is directed more particularly to an aircraft instrument display that includes a combiner that is separate from the windshield.

Instrument displays for the primary aircraft avionic instruments are commonly located on an instrument panel located in front of the pilot and co-pilot seats and below the windshield. Secondary instrument displays and annunciators are sometimes located in an overhead panel above the windshield.

Depending on flying conditions, an aircraft pilot can be continually alternating between scanning the outside scene and scanning the aircraft avionic instrument displays, which requires the pilot to divert his or her eyes from the outside to the instruments and back to the outside. Each diversion also requires refocusing of the eyes.

In recognition of the desirability of head-up viewing of avionics instrumentation displays, head-up displays have been utilized in military aircraft to (1) provide the pilot with target information from radar, (2) provide flight instrumentation information such as an artificial horizon or glideslope indicators, and/or (3) produce synthetic land maps for flight in low visibility weather conditions or flight at low altitude above ground level. However, military head-up displays are complex and expensive, typically achieving their intended functions with large fields of view, complex optics, and cathode ray tubes. Moreover, aircraft for commercial and general aviation do not require the capabilities of military head-up displays, which would be particularly expensive for smaller general aviation aircraft.

Head-up displays have also been implemented for automobiles. However, such head-up displays generally utilize the windshield or apparatus attached to the windshield as the combiner element. The use of the windshield as part of the combiner element presents difficulties in the use of coatings for improving the reflected image and preventing ghost images.

SUMMARY OF THE INVENTION

It would therefore be an advantage to provide an aircraft head-up display that is inexpensive and not complex.

A further advantage would be to provide an aircraft head-up display that does not utilize the windshield as the combiner element.

The foregoing and other advantages are provide by the invention in a head-up display for a vehicle that includes an image source for producing imaging illumination, and a combiner independent of a vehicle windshield for partially reflecting the imaging illumination to produce a virtual image of the image source that is viewable by the operator of the vehicle. More particularly, the combiner comprises a spherical beamsplitter for providing a magnified virtual image.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
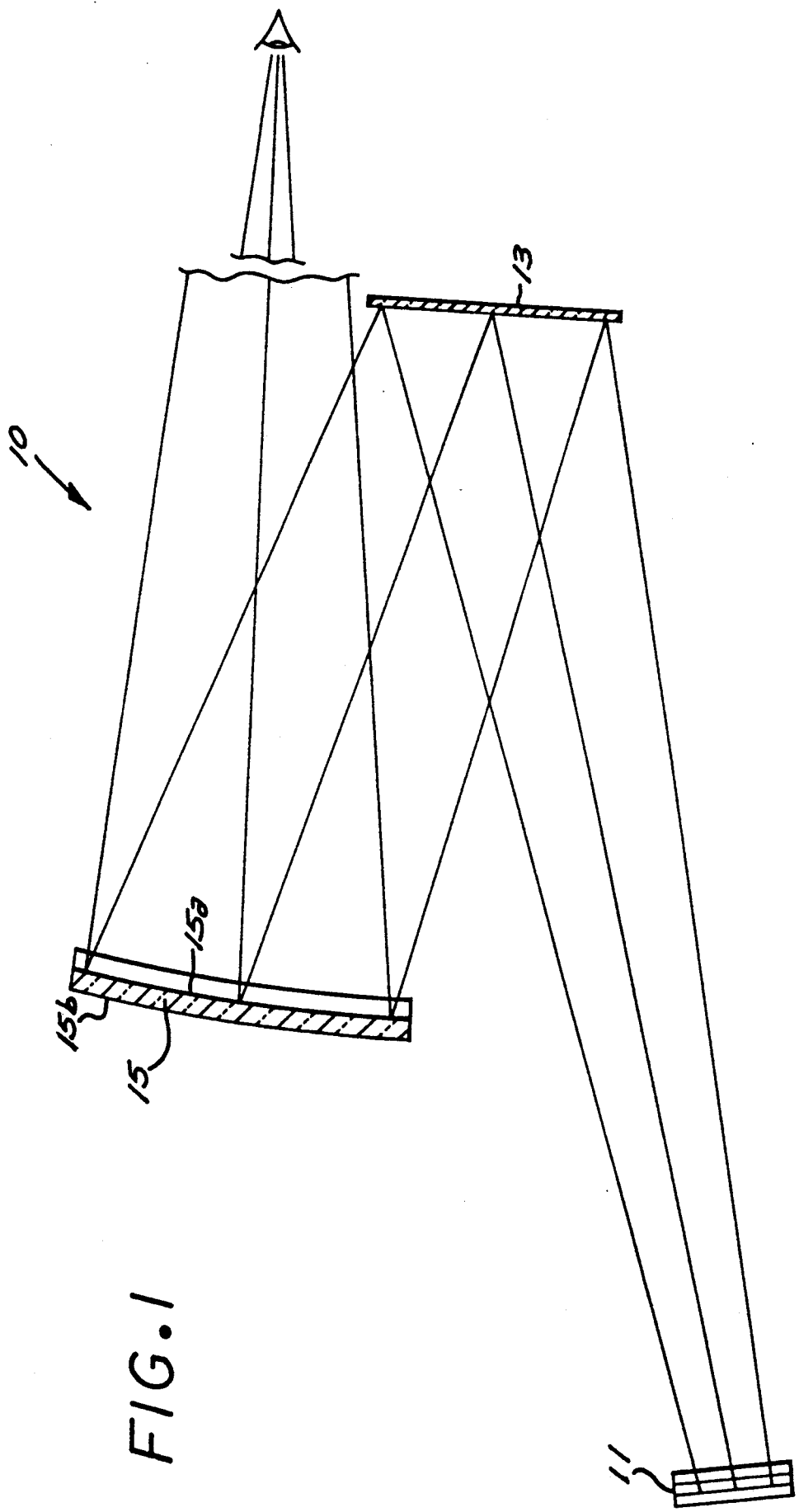
FIG. 1 is a schematic elevational view illustrating an aircraft head-up display system in accordance with the invention.

In the following detailed description and in the several figures of the drawing, like elements are identified with like reference numerals.

The subject disclosure is directed to a head-up display system for a vehicle that is advantageously utilized in commercial and general aviation aircraft, and will be discussed primarily in that context. However, it should be appreciated from the following discussion that the head-up display system of the invention can be utilized in other vehicles.

Figure 2:
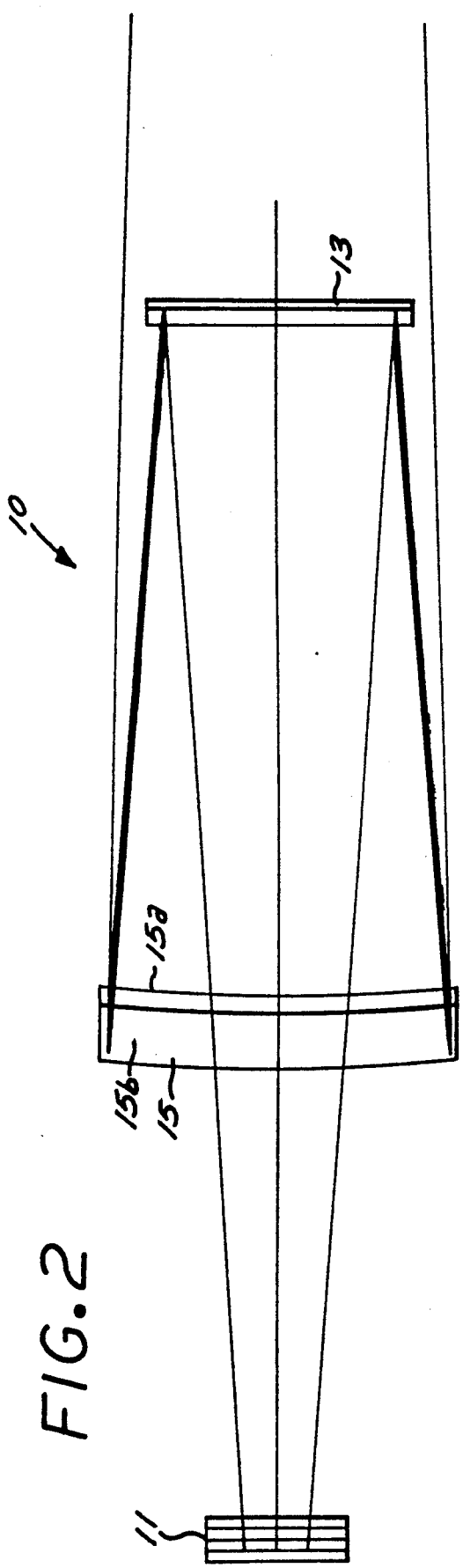
FIG. 2 is a schematic top plan view illustrating the aircraft head-up display system of FIG. 1.

Referring now to FIGS. 1 and 2, shown therein is a head-up display system 10 that includes a light emitting image source 11 for providing imaging illumination to a planar fold mirror 13, which reflects the imaging illumination to a combiner 15.

By way of example, the image source 11 comprises a high intensity vacuum fluorescent display (VFD), for example, such as those commercially available from Futaba Corporation of America, Plymouth, MI. Also, the image source 11 can be a segmented or matrix addressable liquid crystal display (LCD), which for example can be obtained from Seiko of Japan.

More particularly as to an image source 11 comprising an LCD, it would present negative graphics if directly viewed, wherein most of the display would dark and only the segments or pixels comprising the desired display indicia would "on" or transparent. The LCD would include a backlighting scheme, an incandescent bulb and collimating elements for example, whereby light would be transmitted substantially only by the segments or pixels that are on or transparent. Preferably, the illumination elements would be designed so that in combination with the combiner 15 the image of the bulb filament would nominally re-image at the center of the eye box (which is the region in space where the pilot's eyes would located to view the virtual image). Depending on the desired eye box size, the LCD could include a diffuser, for example a thin ground glass layer, on the image side of the LCD for providing a slight amount of diffusion.

Also as to an LCD image source, such displays emit polarized light and preferably would be configured to emit P-polarized light so that polarized sunglasses, which are designed to block S-polarized light, can be used by the pilot without substantially blocking the imaging illumination reflected from the combiner 15.

Since the head-up display system 11 includes an even number of reflective elements in the projection path, the image source 11 is configured to be oriented the same as the virtual image when viewed directly; i.e., the image source is not a mirror image of the virtual image.

Figure 3:
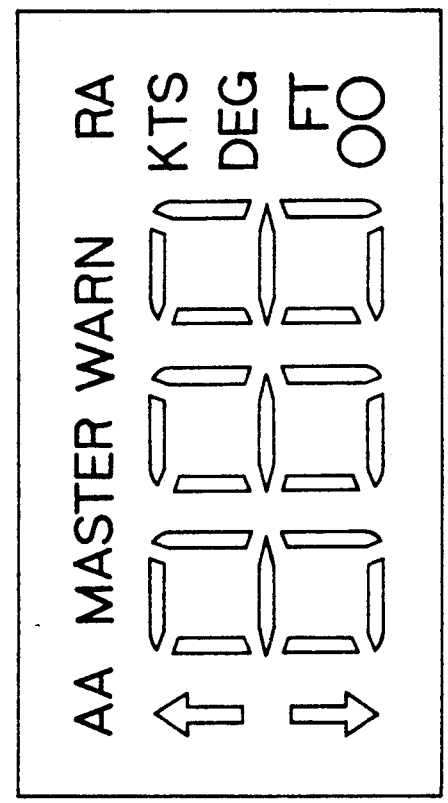
FIG. 3 is a schematic illustration of an exemplary graphics layout of the light emitting elements of the image source of the head-up display of FIG. 1.

The image source 11 can be configured to display one or more instrument readouts, for example selectively pursuant to appropriate control inputs by the pilot. FIG. 3 illustrates an example of a graphical layout for an image source 11 that includes segmented elements for the instrument readout, and fully formed characters and symbols for readout units and annunciators.

The combiner 15 is an off-axis, spherical beam splitter that partially reflects the incident imaging illumination from the fold mirror 13. The combiner includes an appropriate substrate, such as optical grade glass, which includes a concave surface 15a and a convex surface 15b having substantially the same radius. The concave side 15a of the combiner 15 receives the incident imaging illumination, at an incidence angle of about 12 degrees relative to normal for example, and comprises a beam splitter coating that provides about 70% transmission, for example. By way of specific examples, the beam splitter coating on the concave incident side 15a can be a multi-layer metallic coating or a multi-layer dielectric coating. The convex side 15b of the combiner includes an anti-reflection coating to reduce ghost imaging.

The beamsplitter coating on the concave incident side 15a is preferably tailored to P-polarization for a randomly polarized image source as well as for a P-polarized LCD, so that the use of polarizing sunglasses does not substantially block the reflected imaging illumination.

The concave incident side 15a and the convex side 15b of the combiner 15 have substantially the same radius so that the combiner introduces very little distortion in the illumination transmitted therethrough, while magnifying the illumination reflected by the concave incident side 15a. Thus, the combiner 15 produces a magnified virtual image of the image source 11 without substantially distorting the portion of the outside scene viewed through the combiner 15.

Figure 4:
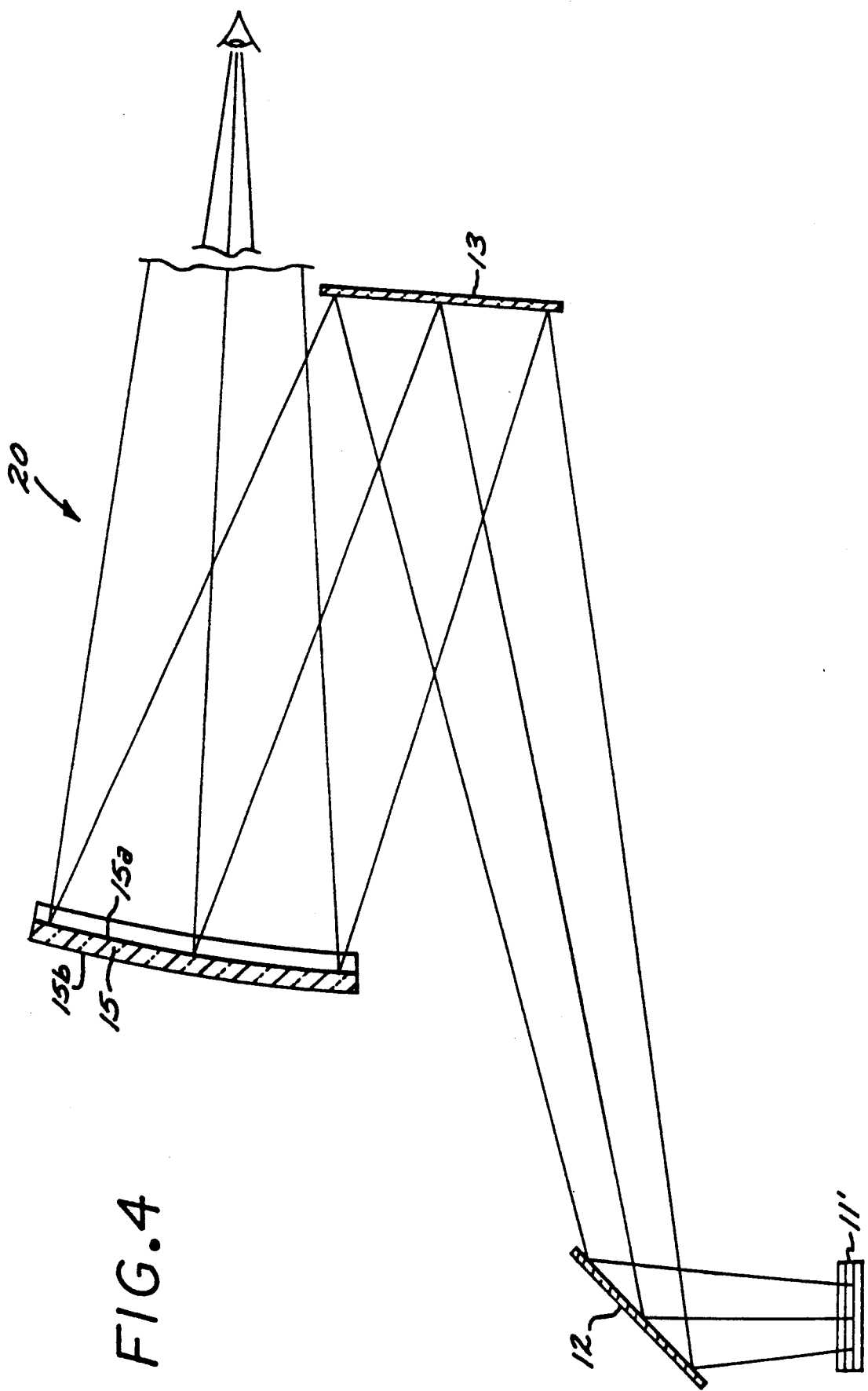
FIG. 4 is a schematic elevational view illustrating a further aircraft head-up display system in accordance with the invention.

Referring now to FIG. 4, shown therein is a further aircraft head-up display system 20 which is similar to the head-up display system 10 of FIG. 1, except that the imaging illumination provided by an image source 11' is relayed to the fold mirror 13 by a fold mirror 12 that is close to the image source 11'. The system of FIG. 4 includes an odd number of reflection elements in the projection path, and would be utilized with an image source 111 that is the mirror image of the intended virtual image when viewed directly.

Figure 5:
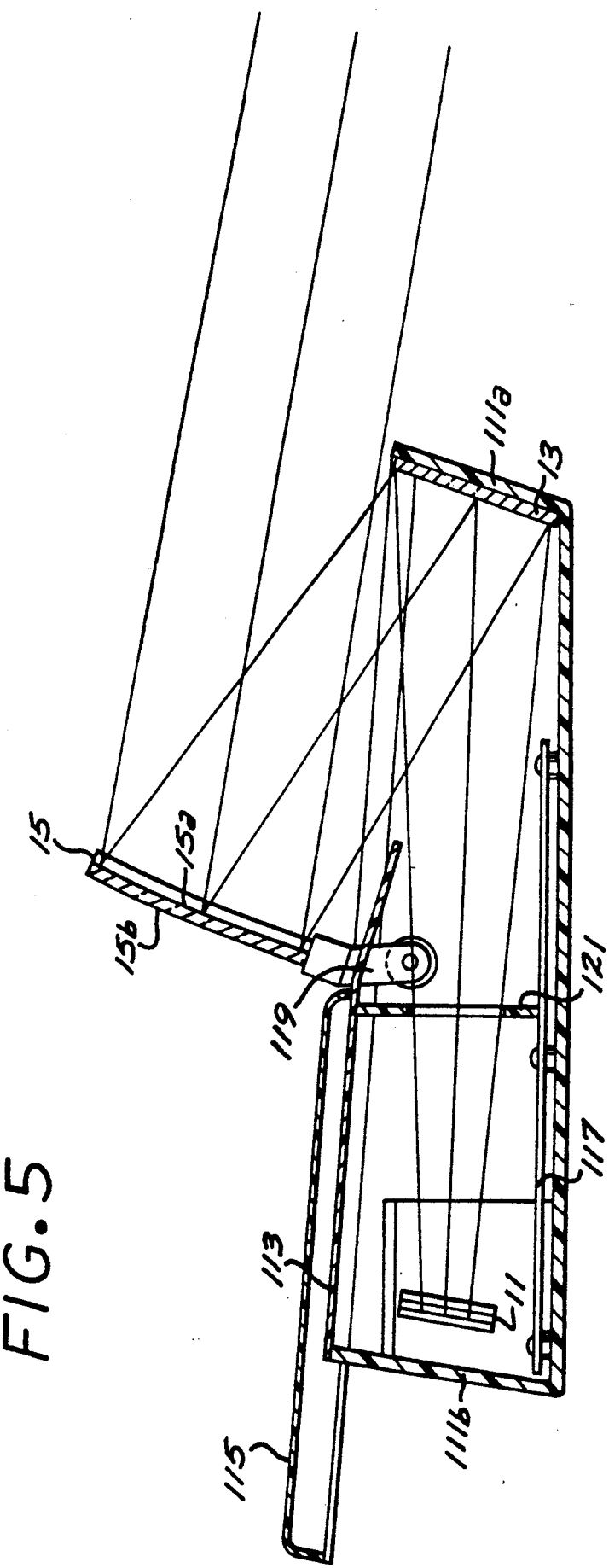
FIGS. 5-7 schematically illustrate a self-contained aircraft head-up display in accordance with the invention.
Figure 6:
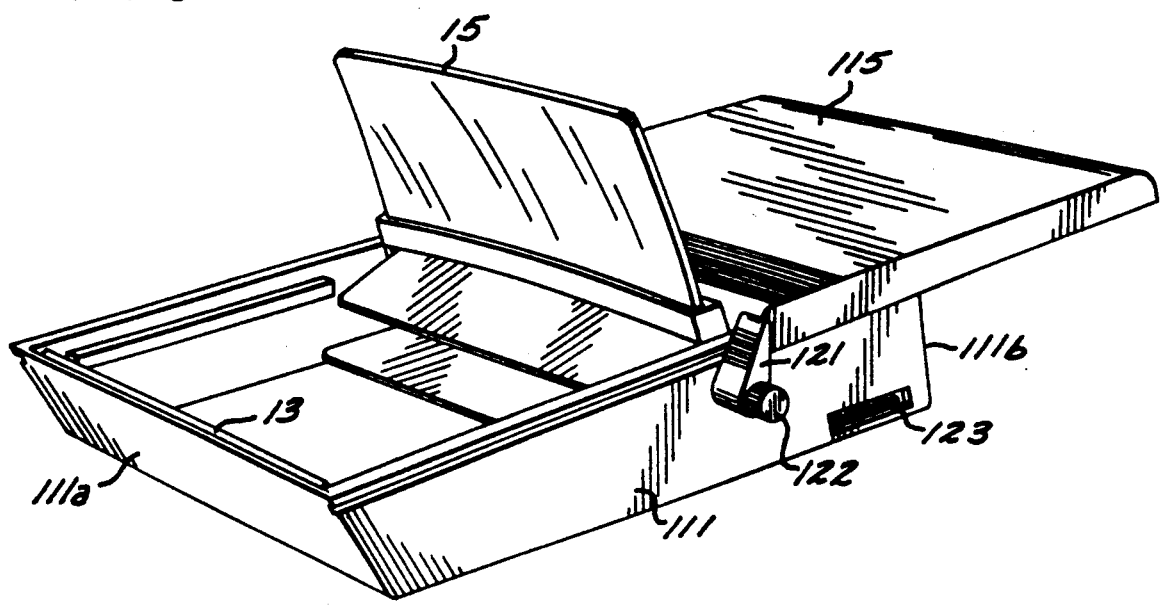
Figure 7:
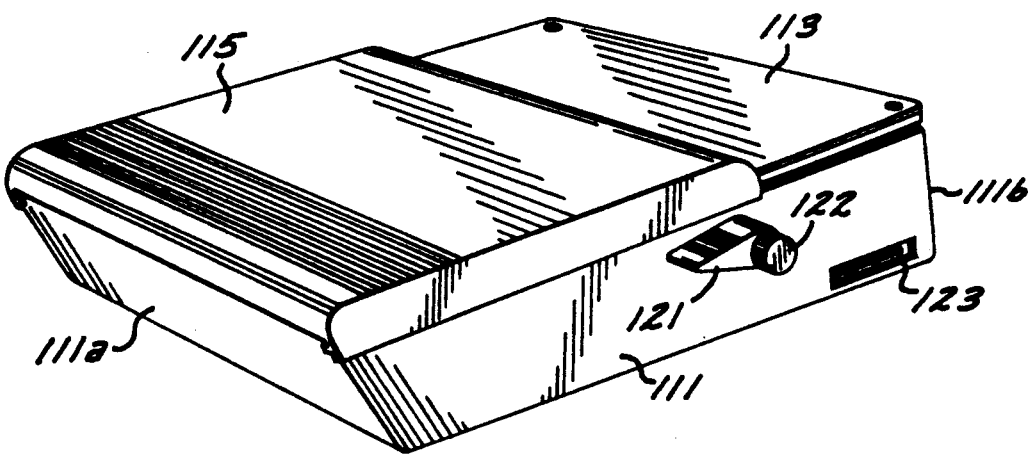

Referring now to FIGS. 5-7, shown therein is a self-contained head-up up display 30 that utilizes the head-up display system 10 schematically shown in FIG. 1. The display system elements are mounted in a housing 111 which is covered by a fixed top cover 113 at the front end 111a thereof, and a slidable top cover 115 that is adapted to cover the remaining portion of the housing 111 and is slidable over the fixed top cover 113.

The image source 11 is mounted at the front end 111a beneath the fixed top cover 113, and can be electrically coupled to circuitry on a circuit board 117 that includes appropriate driver circuitry, for example. Electrical connections are made via a connector 123 which is accessible on the outside of the housing 111.

The fold mirror 13 is mounted at the back end 111b of the housing 111, and an optical baffle 121 is interposed in the optical path between the image source 11 and the fold mirror 13 to prevent ambiant stray illumination (e.g., sunlight) from reaching the image source 11 and also for preventing stray image source illumination from reaching the fold mirror 13.

While not shown, it should be appreciated that dust protection can be provided for the image source 11, for example, an off-axis window that is tilted so as to direct reflections to the top or bottom portions of the housing 111. Also for protection of the mirror surface of the fold mirror 13, a second surface mirror could be utilized instead of the first surface mirror depicted in FIG. 5.

The combiner 15 is secured to a bracket 119 that is pivotally mounted in the housing for rotation about a laterally oriented axis. A rotation lever 121 on the outside of the housing is connected to the bracket 119 for rotation of the bracket and combiner about a laterally extending axis. A locking mechanism including a locking knob 122 selectively retains the bracket and combiner 15 in a fixed position.

The bracket 119, the housing 111, and the slidable top cover 115 are configured to allow the combiner 15 to be rotated into a generally upright position for use, and to allow the combiner to be rotated into the housing 111 and covered by the slidable top cover 115 when not in use.

The self-contained head-up display 30 advantageously permits the combiner 15 to be folded and enclosed when not in use, for example during certain flying conditions or when the aircraft is not being used. Folding and enclosure of the combiner 15 provides for protection of the delicate coatings thereon, and moreover stows it out of the way when use of the head-up display is not desired. Further, the self-contained configuration allows for easy installation of the head-up display in many types of aircraft upon original manufacture or by retrofit.

The foregoing has been a disclosure of a head-up display for aircraft that is simple, relatively inexpensive, and provides the capability of viewing aircraft instrument readouts while viewing the outside scene.

Although the foregoing discussion has been in the context of aircraft, it should be appreciated that the disclosed head-up display system can be utilized in other vehicles wherein a windshield or similar protective device is not utilized as the combiner.

Although the foregoing has been a description and illustration of specific embodiments of the invention, various modifications and changes thereto can be made by persons skilled in the art without departing from the scope and spirit of the invention as defined by the following claims.

What is claimed is:

1. A head-up display for a vehicle comprising:
   a housing;
   an image source located in said housing for producing imaging illumination;
   a combiner for partially reflecting said imaging illumination to produce a virtual image of said image source viewable by the operator of the vehicle;
   support means pivotally engaged in said housing for selectively positioning said combiner in a use position wherein said combiner extends beyond said housing or in a stowed position wherein said combiner is within said housing; and
   a cover for covering said combiner when in the stowed position.

2. The head-up display of claim 1 wherein said image source comprises a vacuum fluorescent display.

3. The head-up display of claim 1 wherein said image source comprises a liquid crystal display.

4. The head-up display of claim 1 wherein said combiner comprises a spherical beamsplitter.

5. The head-up display of claim 4 wherein said beamsplitter includes a reflection coating.

6. The head-up display of claim 5 wherein said beamsplitter includes surfaces of substantially the same radius such that transmitted illumination is substantially not distorted.

7. The head-up display of claim 6 wherein said beamsplitter includes an anti-reflection coating.

8. A head-up display for a vehicle comprising:
   a housing;
   an image source located in said housing for producing imaging illumination;
   a combiner for partially reflecting said imaging illumination to produce a virtual image of said image source viewable by the operator of the vehicle; and
   support means pivotally engaged in said housing for selectively positioning said combiner in a use position and place wherein said combiner extends beyond said housing or in a stowed position wherein said combiner is within said housing.

9. The head-up display of claim 8 wherein said image source comprises a vacuum fluorescent display.

10. The head-up display of claim 8 wherein said image source comprises a liquid crystal display.

11. The head-up display of claim 8 wherein said image source comprises a spherical beamsplitter.

12. The head-up display of claim 11 wherein said beamsplitter includes a reflection coating.

13. The head-up display of claim 12 wherein said beamsplitter includes surfaces of substantially the same radius such that transmitted illumination is substantially not distorted.

14. The head-up display of claim 12 wherein said beamsplitter includes an anti-reflection coating.

* * * * *